Dec. 12, 1961 V. R. DE LONG ET AL 3,013,148
AUTOMATIC TRANSMITTER GAIN CONTROL CIRCUIT
Filed Jan. 13, 1960
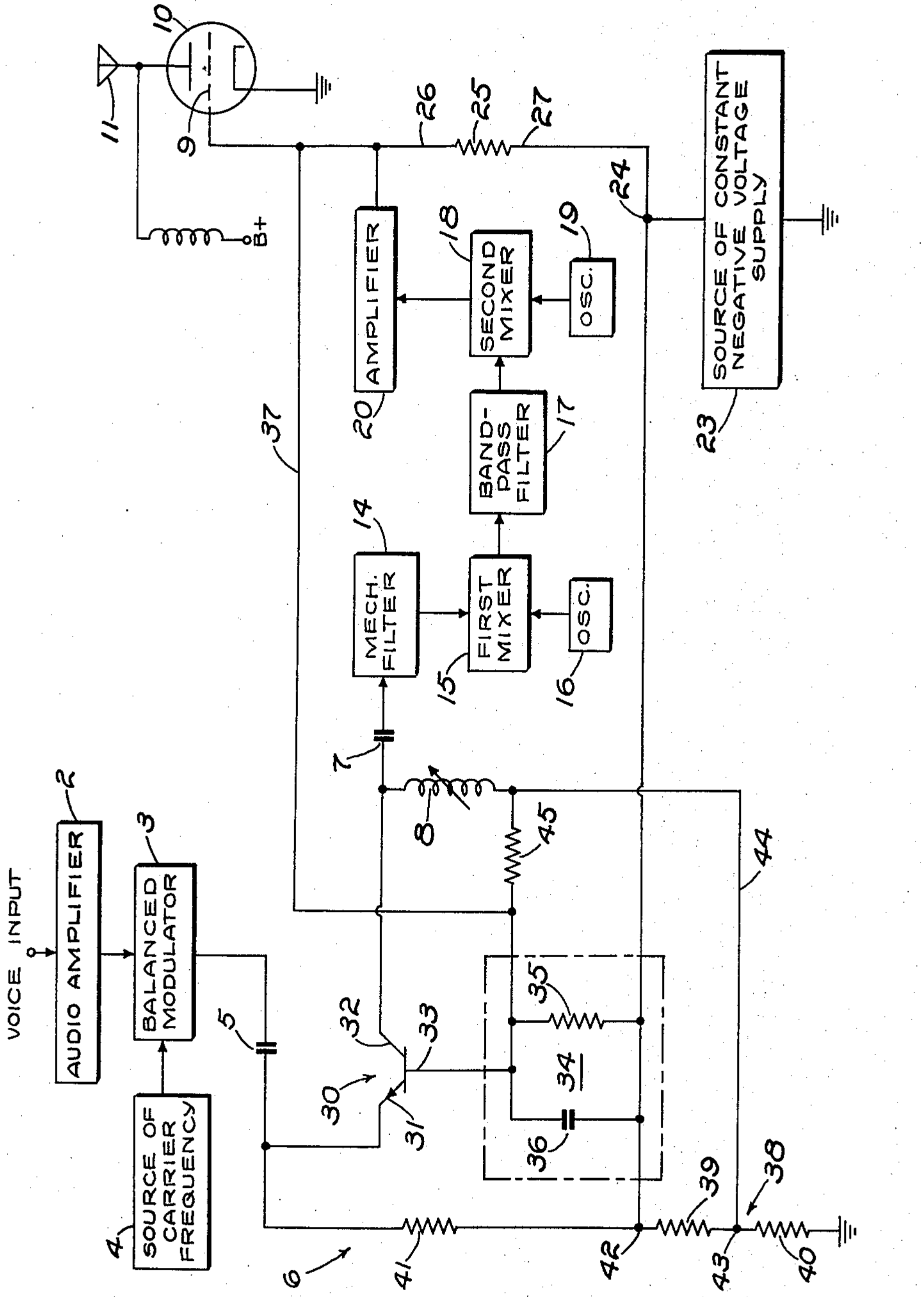
INVENTORS
VINCENT R. DELONG
WILLIAM DOUGLAS RODES
BY Moody and Harris
ATTORNEYS

United States Patent Office 3,013,148

Patented Dec. 12, 1961

3,013,148

AUTOMATIC TRANSMITTER GAIN CONTROL CIRCUIT

Vincent R. De Long and William Douglas Rodes, Marion, Iowa, assignors to Collins Radio Company, Cedar Rapids, Iowa, a corporation of Iowa Filed Jan. 13, 1960, Ser. No. 2,204
1 Claim. (Cl. 250—17)

This invention relates to a transmitter gain control device and more particularly to an electronic device for automatically controlling the drive voltage supplied to the power amplifier of such a transmitter so as to maintain maximum power output at all times without excessive distortion due to grid current.

This invention is incorporated in equipment such as a single sideband transceiver where it is definitely desirable to attain maximum power output without causing appreciable grid current flow in the power amplifier tube, since such grid current causes undesirable distortion in the output from the power amplifier and hence from the transmitter.

Since grid current will normally flow in the power amplifier only when the control grid swings positive with respect to the cathode, maximum power without excessive distortion is most nearly attained when the drive voltage to the transmitter is of sufficient amplitude to cause no more than a very minute amount of grid current to flow, or, in other words, when the power amplifier is operated just at the threshold of grid current.

While various devices and arrangements have been suggested and utilized to control the drive supplied to the control grid of such a power amplifier all of these devices and arrangements have heretofore failed to provide adequate means whereby the power amplifier is automatically and efficiently maintained at the threshold of grid current.

It is therefore an object of this invention to provide means to automatically control the gain of a transmitter and thereby permit constant operation of the power amplifier at the threshold of grid current so as to maintain maximum power output without excessive distortion therefrom.

Accordingly, it is an object of this invention to provide an electronic control device connected between the modulator and power amplifier of a transmitter to automatically control the amplitude of the drive voltage impressed upon the control grid of the power amplifier.

Further, it is an object of this invention to provide a transmitter gain control device which controls the amplitude of the drive voltage supplied to the power amplifier by virtue of being responsive to any flow of control grid current in said power amplifier.

Further objects, features and advantages of this invention will become apparent from the following description and claims when read in view of the accompanying drawing which illustrates schematically a preferred embodiment of the automatic gain control of this invention in a transmitter of the type capable of either amplitude modulation or single sideband transmission.

Referring now to the single FIGURE shown in the drawing, an original audio signal to be transmitted, which may be a voice input, is amplified by audio amplifier 2, and then heterodyned in the balanced modulator 3 which is also supplied with a carrier frequency from a source designated by the numeral 4. Although shown and described in connection with a balanced modulator, it is to be realized, of course, that any conventional modulator could be used without departing from the scope of the invention described herein.

The output, or transmitter drive voltage, from the balanced modulator is coupled through condenser 5 to the transmitter gain control of this invention, designated generally by the numeral 6. The output from the transmitter gain control, in turn, is coupled through capacitor 7, which along with variable inductor 8 is tuned to the operating frequency, to the various filtering, mixing, and amplifying stages deemed desirable preceding application of the drive voltage to the control grid 9 of the power amplifier 10. The output from power amplifier 10 is, of course, fed to transmitting antenna 11.

As shown herein the stages preceding application of the drive voltage to the control grid of the power amplifier may comprise a mechanical filter 14, such as described and claimed in Patent No. 2,615,981, issued to M. L. Doelz on October 28, 1952, to filter out an undesired sideband; a first mixer 15, which is supplied with a second input by oscillator 16, to heterodyne the signal to a higher frequency, for example 2.1 mc.; a bandpass filter 17; a second mixer 18, which is supplied with a second input by oscillator 19, to further heterodyne the signal to the desired operating frequency which, for example, may be 10 mc.; and an amplifier 20, the output of which is then applied to the control grid 9 of power amplifier 10.

The power amplifier 10 may be any conventional type operable as a class $A_1$, $AB_1$ or $B_1$ amplifier, for example. Bias for the power amplifier is obtained from the source of constant negative voltage supply 23, which constantly supplies a common negative voltage, for example −60 volts at point 24. The bias voltage thus supplied is applied to the control grid 9 through control grid leak resistor 25 which has one side 26 connected with the control grid and the other side 27 connected with the negative voltage supply.

The automatic gain control 6 of this invention includes an electronic control device 30, which is preferably a transistor of the NPN type having an emitter 31 which serves as the input electrode, a collector 32 which serves as the output electrode, and a common base 33. Impedance means 34, consisting of a resistor 35 and capacitor 36 in parallel, connects the base 33 with the negative voltage supply 23. In addition to a transistor being more rugged and generally more compact than a vacuum tube, it has the added advantage of operating on limited power and of being operable at the bias voltage of the power amplifier.

Side 26 of resistor 25 in the control grid circuit of the power amplifier is also directly connected to the base of the transistor by means of a lead 37 so that any voltage drop across resistor 25 will be impressed directly upon the base of the transistor to thereby control the gain of the transmitter as brought out more fully hereinafter.

Operating voltages for the transistor are supplied by voltage divider 38, which is connected in parallel with negative voltage supply 23, and can be said to consist of two serially connected resistors 39 and 40. The more negative emitter of the NPN type transistor is connected through resistor 41 with one end 42 of the voltage divider while the more positive collector 32, which may be, for example, 4 volts less negative than the emitter, is connected to the junction 43 between resistors 39 and 40 by means of a lead 44. The base 33, which must only be slightly more positive than the emitter, for example 0.1 volt, is connected to end 42 of the voltage divider through resistor 35 and to the junction between resistors 39 and 40 by resistor 45. Resistor 41 provides current stabilization for the emitter while resistors 35 and 45 provide current stabilization for the base.

In operation, transistor 30 acts as an intermediate stage amplifier with the emitter serving as the input electrode and the collector as the output electrode. So long as the drive voltage supplied to the control grid of the power amplifier is such that the grid is never positive with respect to the cathode, no appreciable current will flow in the grid circuit of the power amplifier and none, of course, will be fed back to the base of the transistor through lead 37. Hence during this period the gain is not, and need not be, controlled since there is obviously no distortion due to grid current. However, as soon as appreciable grid current commences to flow in the power amplifier, there is a voltage drop through the resistance device 25. Since the current flow is from grid to cathode, end 26 of resistor 25 will be more negative than the other end 27. Since end 26 is also directly connected to the base 33 of the transistor, and since the other end 27 of resistor 25 is connected to the common negative voltage source just as is impedance 34 which is also connected to base 33, the negative voltage is therefore impressed upon the positive base of the NPN type transistor. This reduces the gain of the transistor which, of course, operates to reduce the drive voltage subsequently supplied to the control grid of the power amplifier and substantially eliminates any grid current flow. The time constant of the impedance means 34 is preferably such that the transistor bias is then slowly allowed to build back to normal after being sharply reduced when grid current commenced to flow.

It will readily be appreciated that the automatic gain control of this invention is thus able to keep the power amplifier operating at the threshold of screen grid current which, of course, means that the maximum power output will be maintained without excessive distortion due to grid current. If desired, the circuit can be adjusted to allow a very small amount of grid current flow at all times so that the transistor constantly exercises some control over the gain of the transmitter.

It will also readily be appreciated that although a NPN type transistor with a common base has been shown and described herein a transistor having a common emitter could likewise be utilized without departing from the scope of this invention since the circuit could be easily adapted by a routine designer skilled in the art.

It is also evident that a PNP type transistor might likewise be used without departing from the scope of this invention by merely applying lead 37 to the more negative emitter of such a transistor.

In view of the foregoing it should be readily apparent to those skilled in the art that this invention provides a simple, yet effective, means to automatically control the gain of a transmitter so that maximum power output is maintained from the power amplifier without excessive distortion due to grid current flow therein.

What is claimed as our invention is:

In a radio transmitting system, a gain control network wherein a power amplifier tube is caused to operate at maximum power output without excessive distortion due to current flow in the grid-cathode circuit thereof, said gain control network comprising: a transistor for receiving and amplifying a modulated radio frequency signal; a radio frequency power amplifier tube adapted to have its output connected to a transmitting antenna and capable of providing a high power output thereto, the control grid of said amplifier tube being connected with said transistor to receive the output therefrom; resistance means connected between said control grid and the cathode of said amplifier tube so that a potential difference is developed across said resistance means whenever there is current flow in the grid-cathode circuit of said power amplifier tube; a source of negative bias connected to said resistance means at the cathode connected side thereof; means directly connecting the grid connected side of said resistance means to said transistor so that potential difference developed across said resistance means automatically and instantaneously affects the bias on said transistor to reduce the gain of said transistor; and impedance means connected in parallel with said resistance means, said impedance means having a time constant such that the bias on said transistor builds back to normal relatively slowly after being sharply changed due to potential developed across said resistance means.

References Cited in the file of this patent

UNITED STATES PATENTS

| | | |
|---|---|---|
| 2,140,370 | Osborn et al. | Dec. 13, 1938 |
| 2,446,563 | Upton | Aug. 10, 1948 |
| 2,534,073 | Sherwood et al. | Dec. 12, 1950 |
| 2,816,180 | French | Dec. 10, 1957 |
| 2,836,713 | Scott et al. | May 27, 1958 |
| 2,928,051 | Young | Mar. 8, 1960 |